United States Patent
Collins et al.

(10) Patent No.: US 12,054,616 B2
(45) Date of Patent: Aug. 6, 2024

(54) CARBON FIBRE PRECURSORS

(71) Applicant: University of Limerick, Limerick (IE)

(72) Inventors: Maurice Collins, Limerick (IE); Mario Culebras Rubio, Limerick (IE)

(73) Assignee: University of Limerick, Limerick (IE)

( * ) Notice: Subject to any disclaimer, the term of this patent is extended or adjusted under 35 U.S.C. 154(b) by 911 days.

(21) Appl. No.: 16/964,740

(22) PCT Filed: Jan. 22, 2019

(86) PCT No.: PCT/EP2019/051507
§ 371 (c)(1),
(2) Date: Jul. 24, 2020

(87) PCT Pub. No.: WO2019/145299
PCT Pub. Date: Aug. 1, 2019

(65) Prior Publication Data
US 2020/0347232 A1    Nov. 5, 2020

(30) Foreign Application Priority Data
Jan. 24, 2018    (GB) ..................................... 1801189

(51) Int. Cl.
| *C08L 97/00* | (2006.01) |
| *C01B 32/05* | (2017.01) |
| *D01F 8/02* | (2006.01) |
| *D01F 8/16* | (2006.01) |
| *D01F 9/17* | (2006.01) |
| *D01F 9/24* | (2006.01) |

(52) U.S. Cl.
CPC ............ *C08L 97/005* (2013.01); *C01B 32/05* (2017.08); *D01F 8/02* (2013.01); *D01F 8/16* (2013.01); *D01F 9/17* (2013.01); *D01F 9/245* (2013.01); *C08L 2203/12* (2013.01); *C08L 2312/00* (2013.01)

(58) Field of Classification Search
CPC ..................................................... C08L 97/005
See application file for complete search history.

(56) References Cited

U.S. PATENT DOCUMENTS

| 2,854,422 A | 9/1958 | Nichols |
| 2020/0223757 A1 * | 7/2020 | Oettinger .............. C04B 35/532 |

FOREIGN PATENT DOCUMENTS

| CN | 104593906 | 6/2015 |
| CN | 107474374 | 12/2017 |
| EP | 3196905 | 7/2017 |
| WO | 2012156443 | 11/2012 |
| WO | 2014046826 | 3/2014 |
| WO | 2014078120 | 5/2014 |

OTHER PUBLICATIONS

Great Britain Combined Search and Examination Report dated Jun. 28, 2018, for related Great Britain application No. GB1801189.0.
International Search Report dated Mar. 29, 2019, for related PCT application No. PCT/EP2019/051507, filed on Jan. 22, 2019.

* cited by examiner

*Primary Examiner* — Stuart L Hendrickson
(74) *Attorney, Agent, or Firm* — Fish IP Law, LLP

(57) ABSTRACT

A composition for use in the formation of a lignin-based carbon fibre precursor is disclosed. The composition is a blend of a lignin and at least 10 wt % of a thermoplastic elastomer. The thermoplastic elastomer may improve the mechanical properties of the lignin-based blend to the extent that conventional carbon fibre precursor formation processes can be carried out using the blend whereas said processes would have been problematic and/or failed when using only lignin to form the carbon fibre precursors. The thermoplastic elastomer is suitably a thermoplastic polyurethane. A carbon fibre precursor produced using the composition is also disclosed, as is a carbon fibre produced from said carbon fibre precursors. Methods of forming said carbon fibre precursors and carbon fibres are also disclosed.

11 Claims, 4 Drawing Sheets

CARBON FIBRE PRECURSORS

FIELD

The present invention relates to carbon fibre precursors, carbon fibres formed from said carbon fibre precursors and to a method of manufacturing said carbon fibre precursors and carbon fibres. In particular the invention relates to carbon fibre precursors formed from blends of lignin and thermoplastic elastomer material.

BACKGROUND

Carbon fibres are commonly used for many structural applications such as in the aerospace, military, automobile and wind turbine industries. Currently, the vast majority of carbon fibres are produced by heat treatment and pyrolysis of polyacrylonitrile (PAN) carbon fibre precursors which are synthesised from petroleum sources. There are several disadvantages with this use of PAN material as carbon fibre precursors, for example high cost, slow carbonisation and the detrimental environmental impact of the acrylonitrile production.

Lignin may provide a more environmentally benign alternative for carbon fibre production. Lignin is a complex organic polymer present in the cell walls of pith, roots, fruit, buds and bark and, along with hemicellulose and cellulose, is one of the most abundant components of lignocellulosic biomass. However, lignin itself performs poorly during the typical melt spinning process used to form carbon fibre precursors, which makes industrial scale production extremely complicated and difficult. Lignin may also provide carbon fibre precursors of a relatively poor quality, for example such lignin-derived carbon fibre precursors may comprise voids which may adversely affect the physical properties of the carbon fibres produced from such precursors.

Therefore it would be highly desirable to improve the processability of lignin into carbon fibre precursors in order to ultimately improve the environmental profile of carbon fibre products.

Several attempts have been made to modify lignin to improve processability in the formation of carbon fibre precursors and/or carbon fibres. For example, WO 2014/078120 A1 discloses a method involving esterification of a lignin precursor with an acid, acid anhydride, alkyl halide, or acyl halide, to form a reduced Tg (glass transition temperature) lignin. WO 2014/046826 A1 discloses a method of making a carbon fibre which involves heat treating a lignin precursor absent an active ingredient in an inert atmosphere to raise the Tg of the precursor.

However, no efficient and environmentally sound commercial process for manufacturing carbon fibre precursors and/or carbon fibres from lignin has been established.

SUMMARY OF THE INVENTION

The inventors have recognised that in order to improve the processability of lignin in the production of carbon fibre precursors, the thermoplastic behaviour of lignin-derived fibres may need to be increased and the high brittleness of the lignin-derived fibres may need to be reduced. The aim of this invention is to solve the problems associated with lignin processing in order to manufacture carbon fibre precursors with the appropriate mechanical properties for undergoing the common industrial processes of carbon fibre production.

It is therefore one aim of the present invention, amongst others, to provide a carbon fibre precursor that addresses at least one disadvantage of the prior art, whether identified here or elsewhere, or to provide an alternative to existing carbon fibre precursors. For instance it may be an aim of the present invention to provide a lignin-derived carbon fibre precursor which can be manufactured and handled using the common procedures used in the production of polyacrylonitrile carbon fibre precursors.

According to aspects of the present invention, there is provided a composition, fibre, method and use as set forth in the appended claims. Other features of the invention will be apparent from the dependent claims, and the description which follows.

According to a first aspect of the present invention, there is provided a composition for use in the formation of a carbon fibre precursor, the composition comprising a lignin and at least 10 wt % of a thermoplastic elastomer.

The composition of this first aspect is suitable for use in the formation of a carbon fibre precursor. Therefore the composition may be processed to form a carbon fibre precursor using techniques known in the art and as described herein. Suitably the composition is in the form of a pellet or may be processed into pellet form.

The composition comprises a lignin and at least 10 wt % of a thermoplastic elastomer. Suitably the composition consists essentially of the lignin and the thermoplastic elastomer. Suitably the composition consists of the lignin and the thermoplastic elastomer.

The thermoplastic elastomer may be a mixture of thermoplastic elastomer materials or may be a single thermoplastic elastomer material. Suitably the thermoplastic elastomer is a polymeric material. Suitably the composition does not comprise any other polymeric materials except for the lignin and the thermoplastic elastomer.

Suitably the lignin and the thermoplastic elastomer are thoroughly mixed in the composition. The composition may be considered to be a blend of lignin and thermoplastic elastomer.

The inventors have found that the combination of lignin and thermoplastic elastomer provides a composition which has improved properties for processing into a carbon fibre precursor, compared to known compositions comprising only lignin. For example, the composition may be extruded effectively into a fibre which may then be wound onto a bobbin without breaking. The carbon fibre precursor produced by processing the composition of this first aspect may itself have improved properties which enable its usage in the formation of carbon fibres. It is believed that the thermoplastic elastomer advantageously modifies the mechanical properties of the lignin to increase the normally low tenacity and flexibility of the lignin sufficiently to allow processing into carbon fibre precursors and subsequently into carbon fibres.

It is believed that any type of lignin can be utilised in the composition of this first aspect, for example lignin obtained from softwood, hardwood or grass/annual plants. Suitable lignin can be obtained from these sources using various known processes, for example the Kraft, organosolve or soda processes. In some embodiments, more than one type and/or source of lignin is used to provide the lignin of the composition.

Suitably, at least a part of the thermoplastic elastomer comprises functional groups which provide compatibility with lignin. Compatibility with lignin may be determined by the polarity of the polymer and/or functional groups within the polymer. Semi-polar polymers may provide acceptable compatibility with lignin. For example, polyester polyols and polyether polyols may have an appropriate polarity for compatibility with lignin. Said semi-polar polymers may provide parts or segments of the thermoplastic elastomer. Said semi-polar polymers, for example polyester polyols or polyether polyols may provide compatibility with lignin and enable the thermoplastic elastomer to combine with the lignin to provide a composition with the improved mechanical properties discussed herein.

Suitably the thermoplastic elastomer is a polymer comprising polyol groups. By "polymer comprising polyol groups" we mean that the polymer has been formed using a polyol, for example a polyester polyol or a polyether polyol. The polyol may be a diol, such as a polyethylene glycol, and the two hydroxyl groups of the diol may form bonds with other functional groups during formation of the polymer. The polymer comprising polyol groups may therefore not contain any free hydroxyl groups after formation of the polymer. This usage of the term "polyol" is in accordance with the common usage of the term in polymer chemistry.

In some embodiments, the thermoplastic elastomer is a block copolymer comprising at least two different block polymer components. Suitably the thermoplastic elastomer is a linear segmented block copolymer comprising at least two different block polymer components. Suitably one of said at least two different block polymer components provides a "soft segment" and another one of said at least two different block polymer components provides a "hard segment". The terms hard and soft segments in relation to thermoplastic elastomer block copolymers would be known to the person skilled in the relevant art. Suitably the soft segment is chosen to be compatible with lignin, for example by comprising polyol groups. Suitably the soft segment comprises a polyol, suitably a polyether polyol or a polyester polyol. Polyether polyols are known in the art as polymers formed from the polymerisation of an epoxide, for example ethylene oxide. Suitable examples of polyether polyols include polyethylene glycol and polypropylene glycol. Said polyether polyols are diols. Polyester polyols are known in the art as polymers formed from the polymerisation reaction of a glycol (a diol) with a dicarboxylic acid. An example of a polyester polyol is polycaprolactone polyol.

Suitably the thermoplastic elastomer comprises material derived from sustainable biological sources. Said material may reduce the environmental impact of using a thermoplastic elastomer to blend with the lignin and maintain the favourable environmental benefits of using lignin to produce carbon fibre precursors and carbon fibres.

In some embodiments the thermoplastic elastomer is a thermoplastic polyurethane.

Suitably the thermoplastic polyurethane is a block copolymer comprising a polyol, suitably in the soft segment. Such thermoplastic polyurethanes are block copolymers comprising alternating sequences of hard and soft segments. The hard segments are formed by the reaction of diisocyanates with short-chain diols and the soft segments are formed by reaction of diisocyanates with long-chain polyols. The hard segments of the thermoplastic polyurethane may therefore comprise carbamate groups (derived from the diisocyanates).

Suitably the thermoplastic polyurethane is a block copolymer comprising a polyether polyol or a polyester polyol. Said thermoplastic polyurethanes may alternatively be referred to as being formed using a polyol (for example a polyether polyol or a polyester polyol) or being derived from said polyol. The thermoplastic polyurethanes may therefore comprise said polyol (for example a polyether polyol or a polyester polyol) covalently bonded into larger polymer chains comprising other groups/segments.

The use of a diisocyanate comprising an aryl group (which may otherwise be known as an aromatic diisocyanate) in the formation of the thermoplastic polyurethane may improve the compatibility of the lignin and thermoplastic elastomer. Examples of diisocyanates comprising an aryl group are toluene diisocyanate (TDI) and methylene diphenyl diisocyanate (MDI). Said diisocyanates comprising an aryl group form carbamate (urethane) groups (or linkages) comprising said aryl group (which may otherwise be known as aromatic carbamate groups) in the thermoplastic polyurethane.

The overall properties of the composition of this first aspect may be dependent on other properties of the thermoplastic elastomer, besides the compatibility with lignin. For example, the content of phenolic and/or aromatic groups in the thermoplastic elastomer may be important in providing the advantageous properties of the composition of this first aspect. The inventors have found certain polyurethanes to be particularly advantageous in providing compatibility with lignin and in providing desirable mechanical properties in the composition of this first aspect, for example polyurethanes comprising (i.e. formed from) polyether polyols or polyester polyols. Thermoplastic polyurethanes formed from a diisocyanate comprising an aryl group and polyether polyols or polyester polyols may be particularly advantageous.

An example of a suitable thermoplastic polyurethane is TPU Pearlthane ECO 12T95 supplied by Lubrizol.

Pearlthane ECO 12T95 is formed from a polyester diol derived from castor oil (to provide soft segments), MDI, dipropylene glycol (minor amount) and 1,4-butanediol (as a "chain extender" providing hard segments on reaction with the MDI).

The composition of this first aspect comprises at least 10 wt % of the thermoplastic elastomer and/or mixtures of thermoplastic elastomers. Suitably the composition comprises at least 20 wt % of the thermoplastic elastomer, suitably at least 25 wt %, suitably at least 30 wt %, suitably at least 35 wt %, suitably at least 40 wt %.

Suitably the composition comprises up to 60 wt % of the thermoplastic elastomer, suitably up to 55 wt %, suitably up to 50 wt %.

Suitably the composition comprises from 10 to 60 wt % of the thermoplastic elastomer, suitably from 20 to 60 wt %, suitably from 25 to 55 wt % or from 25 to 50 wt %.

Suitably the composition comprises a crosslinking agent. Said crosslinking agent may provide crosslinks between chains of the lignin or between the chains of thermoplastic elastomer on formation of carbon fibre precursors from the composition, for example by reactive extrusion.

The crosslinking agent may be selected from any one or more of isocyanates (for example 4,4'-Methylene diphenyl isocyanate) and diglycidyl compounds (for example neopentyl glycol diglycidyl ether). Other suitable chemical species capable of reacting with hydroxyl groups to enable the crosslinking of polymer chains may also be used as said crosslinking agent.

According to a second aspect of the present invention, there is provided a fibre for use as a carbon fibre precursor, the fibre comprising a lignin and at least 10 wt % of a thermoplastic elastomer.

The fibre of this second aspect may be produced from the composition of the first aspect. The lignin and the thermoplastic elastomer may have any of the suitable features and advantages described in relation to the lignin and the thermoplastic elastomer in the composition of the first aspect.

The fibre of this second aspect may be alternatively or additionally defined as a carbon fibre precursor.

The fibre of this second aspect may have a lower cost of production than known carbon fibre precursors. The fibre of this second aspect may be produced using winding apparatus typically used to produce conventional PAN carbon fibre precursors. Furthermore, the fibre of this second aspect may have an improved environmental profile compared to conventional carbon fibre precursors and may have improved mechanical properties compared to known lignin-derived carbon fibre precursors.

According to a third aspect of the present invention, there is provided a carbon fibre produced from a composition according to the first aspect or a fibre according to second aspect.

The carbon fibres of this third aspect can be produced using conventional equipment and techniques and may exhibit mechanical properties comparable to or better than the current state of the art. Therefore the carbon fibres of this third aspect may be suitable for use in high performance applications such as in the manufacture of automotive components.

The carbon fibres of this third aspect may be distinguishable from prior art carbon fibres by analytical techniques such as Raman spectroscopy or XRD analysis, due to the effects on the structure of the carbon fibres of the composition comprising lignin and at least 10 wt % of a thermoplastic elastomer used as the carbon fibre precursor.

Suitably the carbon fibres of this third aspect comprise of greater than 90 wt % carbon atoms and have a diameter of from 5 to 10 μm.

According to a fourth aspect of the present invention, there is provided a material comprising a plurality of carbon fibres according to the third aspect.

In some embodiments, the material may be a fabric material comprising the plurality of carbon fibres woven together.

In some embodiments, the material may be a composite material comprising the plurality of carbon fibres arranged in a binder, for example in a polymeric binder material.

According to a fifth aspect of the present invention, there is provided a method of producing a fibre for use as a carbon fibre precursor, the method comprising the steps of:
a) blending lignin and a thermoplastic elastomer;
b) extruding the lignin and the thermoplastic elastomer to provide the fibre.

The lignin and the thermoplastic elastomer may have any of the suitable features and advantages described in relation to the lignin and the thermoplastic elastomer in the composition of the first aspect. The fibre produced by this method may have any of the suitable features and advantages of the fibre of the second aspect.

Suitably the steps of the method are carried out in the order step a) followed by step b).

Suitably the method comprises a step a1) of extruding the lignin and the thermoplastic elastomer to provide pellets, wherein step b) involves extruding the pellets to provide the fibre.

Suitably step b) is carried out at a temperature of at least 150° C.

Suitably the blend of lignin and thermoplastic elastomer provided in step a) comprises a crosslinking agent.

The addition of a crosslinking agent may provide a fibre which undergoes a stabilisation phase of carbon fibre production more quickly than known carbon fibre precursors.

Step b) may be a reaction extrusion step, for example by including a crosslinking agent in the blend of lignin and thermoplastic elastomer provided in step a), or by using electron beam processing during the extrusion.

According to a sixth aspect of the present invention, there is provided a method of producing a carbon fibre, the method comprising the steps of:
1) obtaining a fibre according to the method of the fifth aspect;
2) carbonising the fibre obtained in step 1) to provide the carbon fibre.

Suitably the steps of the method are carried out in the order step 1) followed by step 2).

Suitably step 2) is preceded by a step 1a) of stabilising the fibre obtained by step 1) by heating. Suitably the stabilisation step 1a) is carried out by heating the fibre at a temperature of at least 150° C. and suitably up to 350° C., for example a temperature of approximately 250° C.

Suitably step 2) of carbonising the fibre is carried by heating the fibre at a temperature of at least 800° C. and suitably up to 1,200° C., for example a temperature of approximately 1,000° C.

In some embodiments, step 2) involves carbonising the fibre by heating the fibre at a temperature of up to 2,500° C., suitably up to 2,200° C.

According to a seventh aspect of the present invention, there is provided a use of a thermoplastic elastomer for increasing the processability of a composition comprising lignin into carbon fibre precursors and/or carbon fibres.

The lignin and the thermoplastic elastomer may have any of the suitable features and advantages described in relation to the lignin and the thermoplastic elastomer in the composition of the first aspect.

Suitably the thermoplastic elastomer increases the percentage strain-to-break of the carbon fibre precursors compared with a carbon fibre precursor comprising only the lignin.

Suitably the thermoplastic elastomer decreases the Young's Modulus of the carbon fibre precursors compared with a carbon fibre precursor comprising only the lignin.

Suitably the thermoplastic elastomer increases the maximum strain the carbon fibre precursors can withstand compared with a carbon fibre precursor comprising only the lignin.

Suitably the thermoplastic elastomer increases the maximum tensile stress the carbon fibre precursors can withstand before breakage compared with a carbon fibre precursor comprising only the lignin.

BRIEF DESCRIPTION OF THE FIGURES

For a better understanding of the invention, and to show how example embodiments may be carried into effect, reference will now be made to the accompanying drawings in which.

EXAMPLES

Materials

Lignins: Alcell organosolve hardwood lignin (TCA) with a Mw of 3952 g/mol and modified (hydroxy propyl) Kraft hardwood(TCC) with a Mw of 11357 g/mol were obtained from Tecnaro co. (Germany). TPU (thermoplastic polyurethane) Pearlthane ECO 12T95 obtained from Veltox (France) (manufactured by Lubriozol) was used as the thermoplastic elastomer.

Preparation of Lignin/TPU Blends

The TCA and TCC lignins were separately blended with the thermoplastic elastomer TPU to provide a TCA/TPU blend and a TCC/TPU blend. Each blend was then extruded using an Xplore mircrocompounder MC15. The content of thermoplastic elastomer in each of the TCA/TPU and TCC/TPU blends varied from 10 to 50%. The samples were extruded twice, the first time to form pellets and the second time to form fibres (carbon fibre precursor fibres). In the first extrusion, the pellets were extruded in a counter-rotating mode using a separated heating control at temperatures of 175, 190, 200 and 190° C. to provide pellets with a diameter and/or length of approximately 5 mm. To form the fibres, the pellets were extruded using a single hole die with a diameter of 500 microns at temperatures of 155, 190, 200 and 190° C. This provided fibres having a diameter of from 100 to 200 μm. As they were formed, the fibres were wound onto bobbins using an automatic winder to provide fibres of TCA/TPU and TCC/TPU.

Results and Characterization

The process described above was carried out continuously and the fibres showed an excellent processability, maintaining their integrity during the whole winding process.

Figure 1:
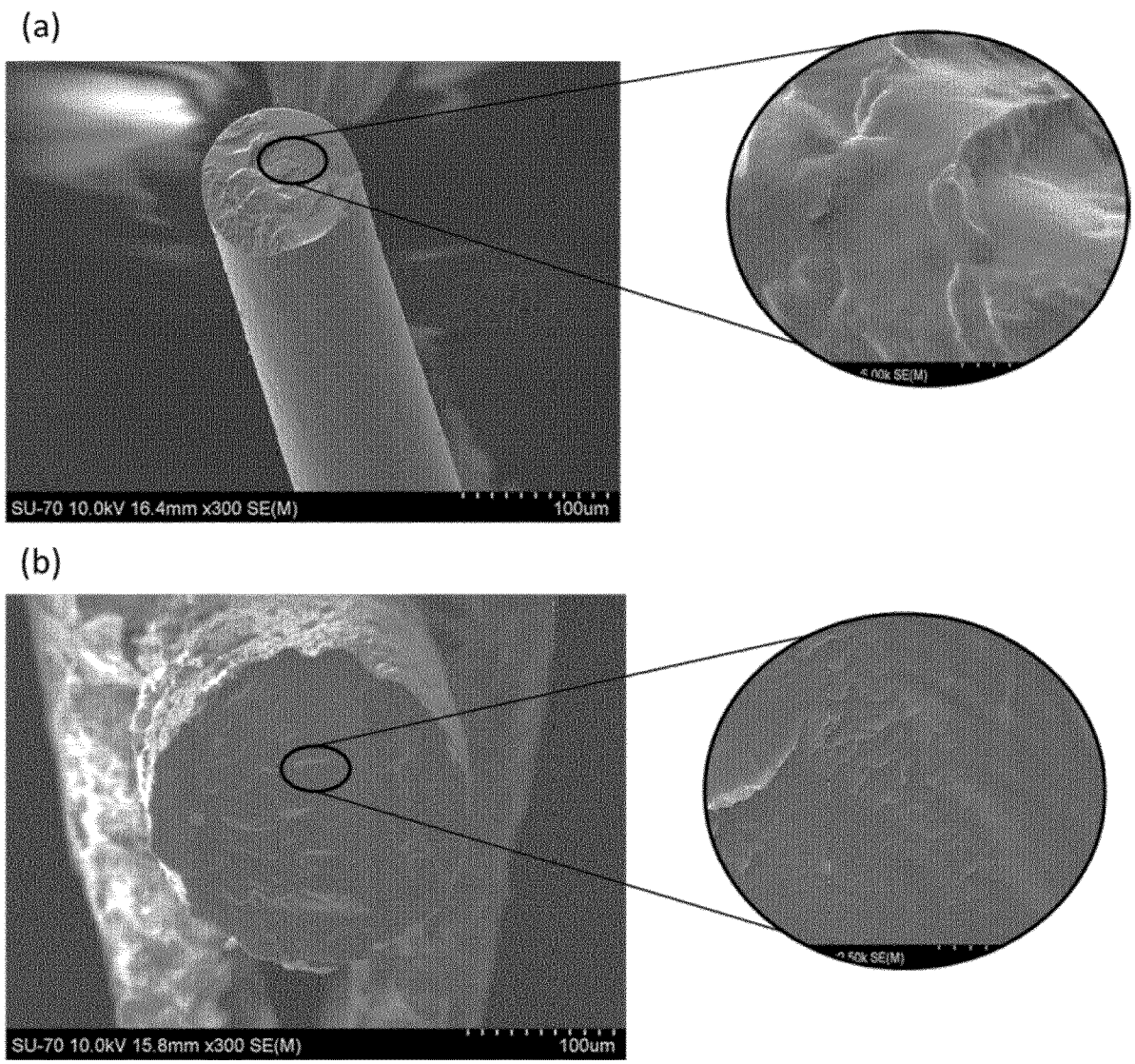
FIG. 1 shows scanning electron microscope (SEM) images of the carbon fibre precursors of TCA/TPU (FIG. 1a) and TCC/TPU (FIG. 1b).

FIG. 1 shows scanning electron microscope (SEM) images of the carbon fibre precursors of TCA/TPU (FIG. 1a) and TCC/TPU (FIG. 1b). In both cases the SEM images show a good compatibility between the two polymers as phase separation was not observed in the cross-section images.

Figure 2:
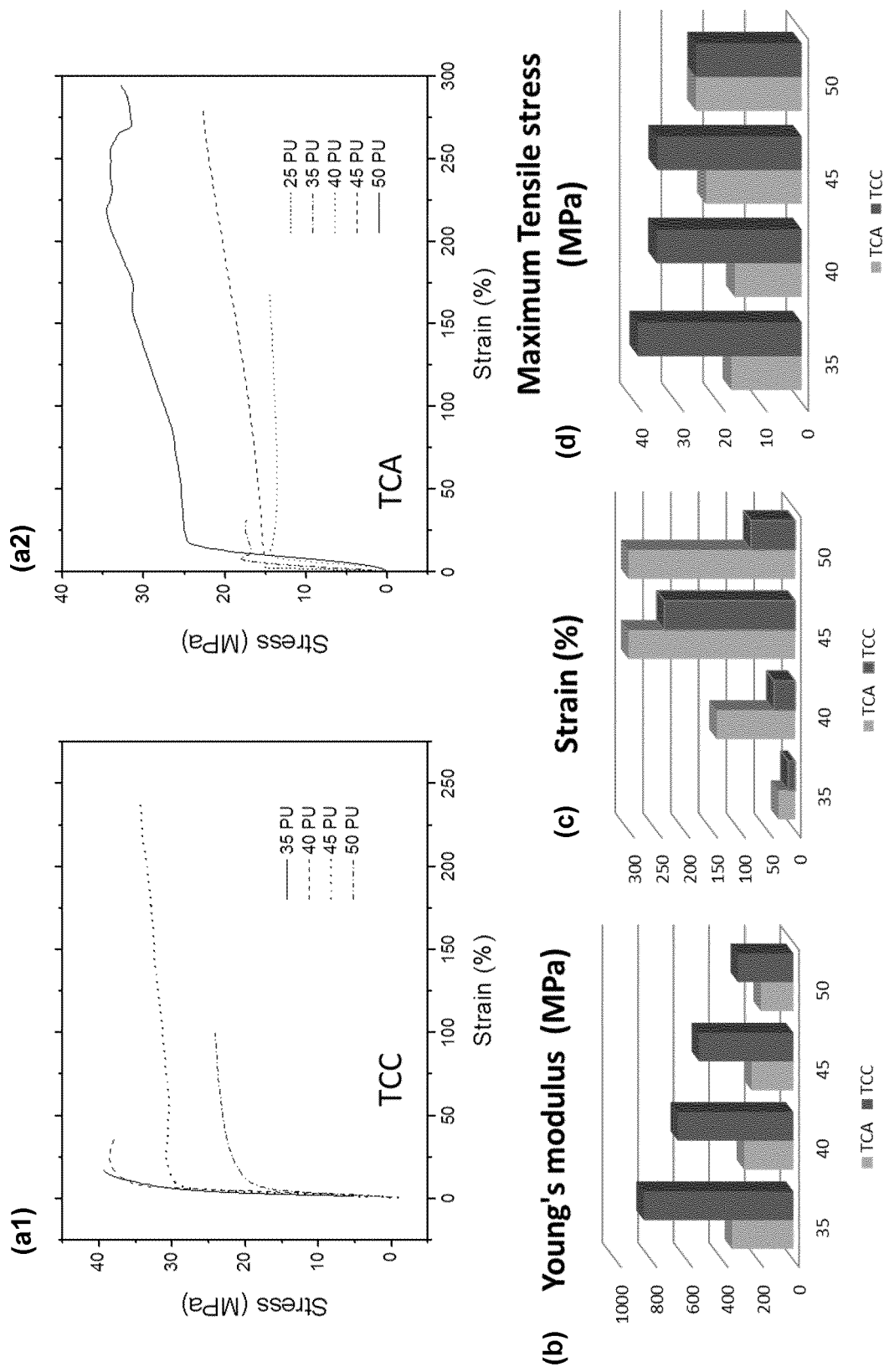
FIG. 2 shows: in (a1) and (a2) tensile stress as a function of the strain for the precursor fibres of TCC/TPU and TCA/TPU respectively, in (b) Young's modulus of the precursor fibres of TCC/TPU and TCA/TPU, in (c) maximum strain of the precursor fibres of TCC/TPU and TCA/TPU and in (d) tensile stress before break of the TCC/TPU and TCA/TPU precursor fibres.

The mechanical properties of the precursor fibres were measured according to the standard ASTM D 3379. FIG. 2 shows: in (a1) and (a2) tensile stress as a function of the strain for the precursor fibres of TCC/TPU and TCA/TPU respectively, in (b) Young's modulus of the precursor fibres of TCC/TPU and TCA/TPU, in (c) maximum strain of the precursor fibres of TCC/TPU and TCA/TPU and in (d) tensile stress before break of the TCC/TPU and TCA/TPU precursor fibres. FIG. 2(a2) shows a large plastic region that increases with the TPU content for the TCA/TPU precursors fibres. Elongations higher than 300% and 30 MPa of tensile stress were achieved with the addition of 50% of TPU in the TCA/TPU precursor fibres, improving the mechanical performance. These mechanical properties are sufficient to allow the carbon fibre precursors to undergo a standard carbon fibre production method without issue.

Carbon Fibre Formation

The TCA/TPU and TCC/TPU fibres were stabilised by heating from room temperature to 250° C. using a heating rate of 0.25° C./min under air atmosphere (see Table 1). All the samples for both types of lignin/TPU blend fibres showed excellent behaviour during the stabilisation step keeping the shape and the integrity during the whole process (the ticks in Table 1 represent a successful process). The stabilised fibres were then carbonised by heating the fibres under a nitrogen atmosphere from room temperature to 1,000° C. at a heating rate of 10° C./min. The samples were carbonised without problems, obtaining well-defined carbon fibres for all the compositions studied (see Table 1).

TABLE 1

Lignin/TPU samples stabilized and carbonized.

| Sample Components | Ratio | ox. stabilised at 250° C. | carbonised at 1000° C. |
|---|---|---|---|
| TCC-TPU | 50/50 | ✓ | ✓ |
| TCC-TPU | 55/45 | ✓ | ✓ |
| TCC-TPU | 60/40 | ✓ | ✓ |
| TCC-TPU | 65/35 | ✓ | ✓ |
| TCC-TPU | 70/30 | ✓ | ✓ |
| TCA-TPU | 50/50 | ✓ | ✓ |
| TCA-TPU | 55/45 | ✓ | ✓ |
| TCA-TPU | 60/40 | ✓ | ✓ |
| TCA-TPU | 65/35 | ✓ | ✓ |
| TCA-TPU | 70/30 | ✓ | ✓ |

Figure 3:
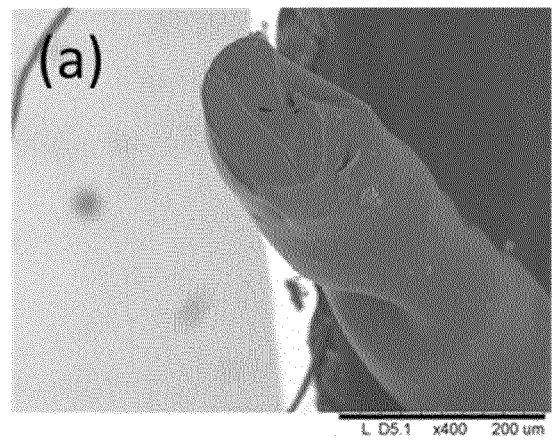
FIG. 3 shows SEM images of the carbon fibres produced from TCA/TPU carbon fibre precursors having a TPU content of (a) 50%, (b) 45%, (c) 40%, (d) 35% and (e) 30%.
Figure 3:
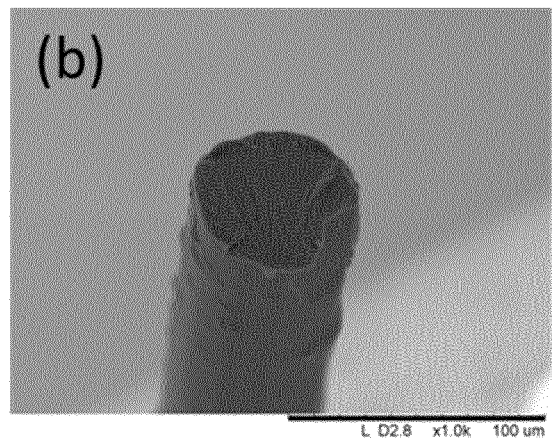
Figure 3:
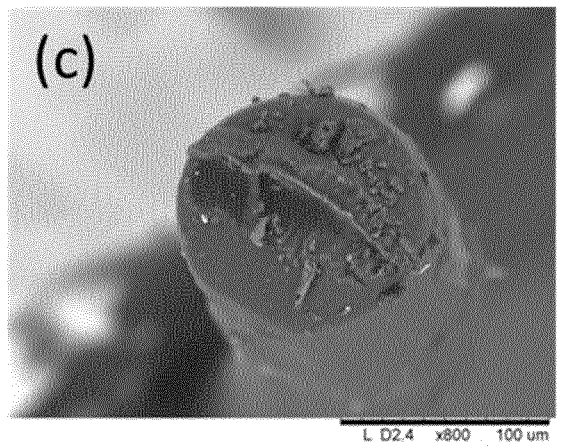
Figure 3:
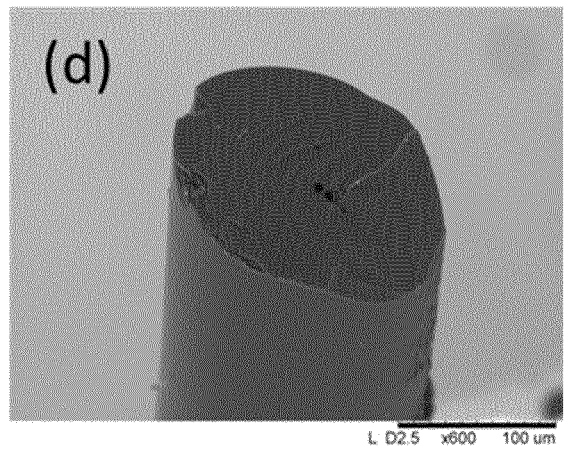
Figure 3:
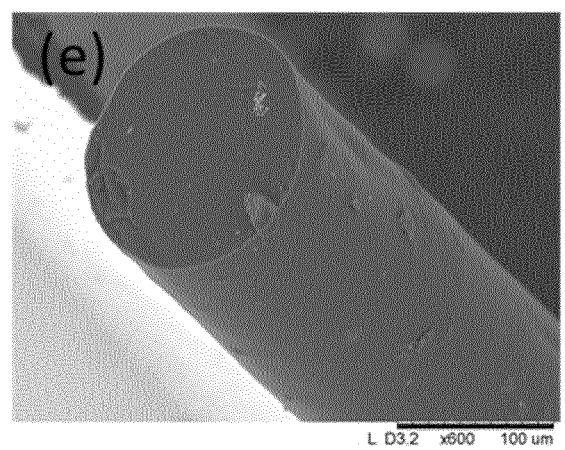
Figure 4:
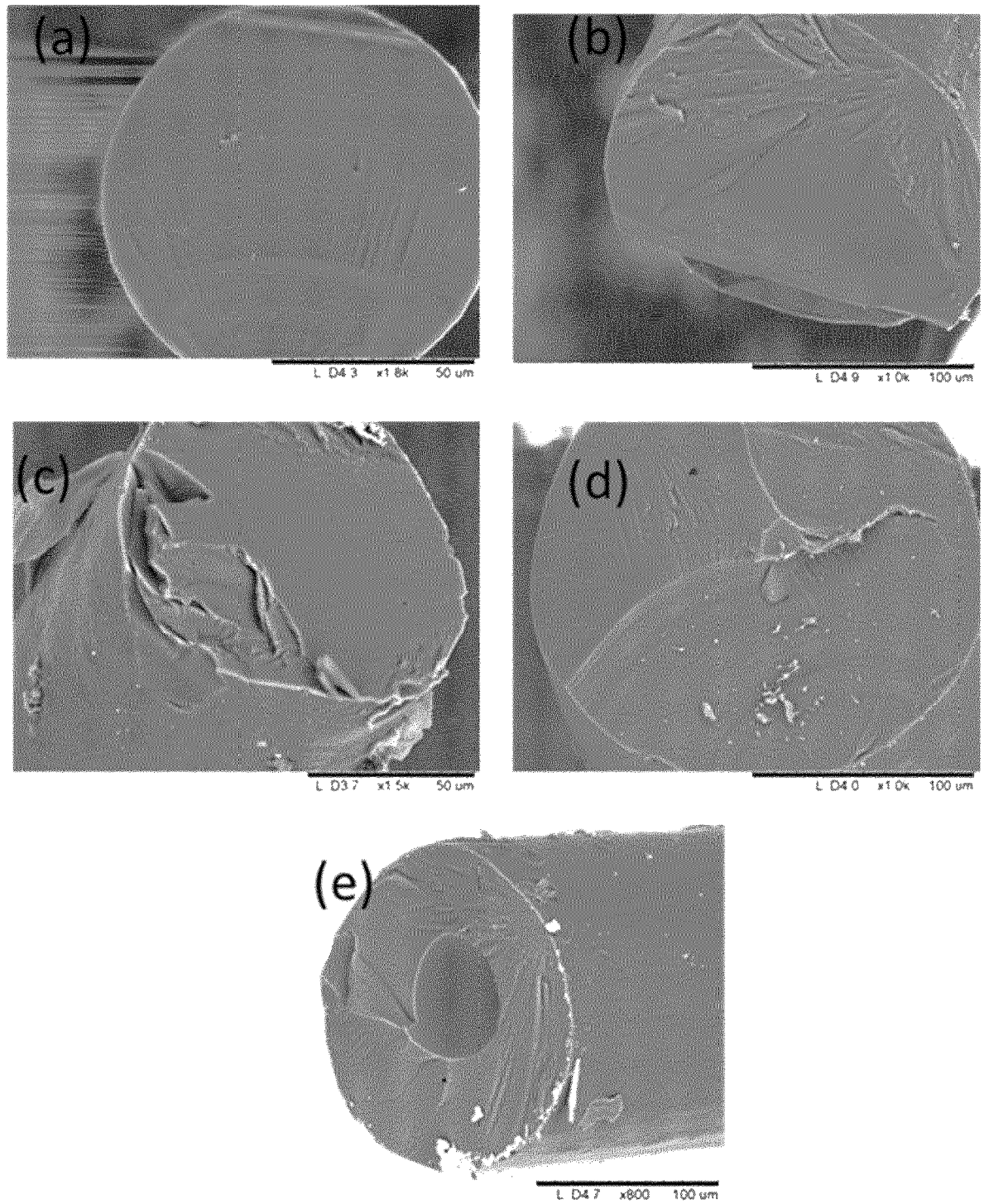
FIG. 4 shows SEM images of the carbon fibres produced from TCC/TPU carbon fibre precursors having a TPU content of (a) 50%, (b) 45%, (c) 40%, (d) 35% and (e) 30%.

FIGS. 3 and 4 show SEM images of the carbon fibres produced form TCA/TPU and TCC/TPU precursors. FIG. 3 shows SEM images of the carbon fibres produced form TCA/TPU carbon fibre precursors having a TPU content of (a) 50%, (b) 45%, (c) 40%, (d) 35% and (e) 30%. FIG. 4 shows SEM images of the carbon fibres produced form TCC/TPU carbon fibre precursors having a TPU content of (a) 50%, (b) 45%, (c) 40%, (d) 35% and (e) 30%. The images show a good morphology due to the lack of porosity in both cases.

In summary, TPU has been found to be a beneficial additive for lignin by increasing its processability by melt spinning. In addition, the morphology of the final carbon fibres produced from the lignin/thermoplastic elastomer carbon fibre precursors indicates a good compatibility between both components, which is important for a high mechanical performance of such carbon fibres produced from blended carbon fibre precursors.

The present invention provides a composition for use in the formation of a lignin-based carbon fibre precursor. The composition is a blend of a lignin and at least 10 wt % of a thermoplastic elastomer. The thermoplastic elastomer may improve the mechanical properties of the lignin-based blend to the extent that conventional carbon fibre precursor formation processes can be carried out using the blend whereas said processes would have been problematic and/or failed when using only lignin to form the carbon fibre precursors. The thermoplastic elastomer is suitably a thermoplastic polyurethane. A carbon fibre precursor produced using the composition is also provided, as is a carbon fibre produced from said carbon fibre precursors. Methods of forming said carbon fibre precursors and carbon fibres are also provided.

Although a few preferred embodiments have been shown and described, it will be appreciated by those skilled in the art that various changes and modifications might be made without departing from the scope of the invention, as defined in the appended claims.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

For the avoidance of doubt, wherein amounts of components in a composition are described in wt %, this means the weight percentage of the specified component in relation to the whole composition referred to. For example, "the composition comprising at least 10 wt % of a thermoplastic elastomer" means that 10 wt % of the composition is provided by the thermoplastic elastomer.

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A carbon fibre precursor fibre, the composition comprising a lignin and at least 10 wt % of a thermoplastic elastomer, wherein the thermoplastic elastomer is a thermoplastic polyurethane.

2. The carbon fibre precursor fibre according to claim 1, wherein the thermoplastic polyurethane is a block copolymer comprising a polyol.

3. The carbon fibre precursor fibre according to claim 2, wherein the polyol is a polyether polyol or a polyester polyol.

4. The carbon fibre precursor fibre according to claim 1 comprising at least 20 wt % of the thermoplastic elastomer.

5. The carbon fibre precursor fibre according to claim 1 comprising a crosslinking agent.

6. A method of producing a carbon fibre precursor fibre, the method comprising the steps of:
    a) blending lignin and a thermoplastic elastomer;
    b) extruding the lignin and the thermoplastic elastomer to provide the carbon fibre precursor fibre according to claim 1.

7. The method according to claim 6 comprising a step a1) of extruding the lignin and the thermoplastic elastomer to provide pellets, wherein step b) involves extruding the pellets to provide the carbon fibre precursor fibre.

8. The method according to claim 6, wherein step b) is carried out at a temperature of at least 150° C.

9. The method according to claim 6, wherein the blend of lignin and thermoplastic elastomer provided in step a) comprises a crosslinking agent.

10. A method of producing a carbon fibre, the method comprising the steps of:
    1) obtaining a carbon fibre precursor fibre according to the method of claim 6;
    2) carbonising the carbon fibre precursor obtained in step 1) to provide the carbon fibre.

11. The method of claim 6, wherein the thermoplastic elastomer is provided in an amount effective to increase processability of lignin into carbon fibre precursor fibres or carbon fibres.

* * * * *